(12) United States Patent
Jacobine et al.

(10) Patent No.: US 8,883,941 B2
(45) Date of Patent: Nov. 11, 2014

(54) METHODS AND APPARATUS FOR CONTROLLED SINGLE ELECTRON TRANSFER LIVING RADICAL POLYMERIZATION

(71) Applicant: Henkel Corporation, Rocky Hill, CT (US)

(72) Inventors: Anthony F. Jacobine, Meriden, CT (US); John G. Woods, Farmington, CT (US); Scott Senuta, Ledyard, CT (US); David P. Dworak, East Hartford, CT (US); Debora E. Duch, Glastonbury, CT (US); John Mazzullo, Portland, CT (US)

(73) Assignee: Henkel Corporation, Rocky Hill, CT (US)

( * ) Notice: Subject to any disclaimer, the term of this patent is extended or adjusted under 35 U.S.C. 154(b) by 0 days.

(21) Appl. No.: 13/846,088

(22) Filed: Mar. 18, 2013

(65) Prior Publication Data

US 2014/0275448 A1    Sep. 18, 2014

(51) Int. Cl.
| | | |
|---|---|---|
| C08F 2/00 | (2006.01) | |
| C08F 4/00 | (2006.01) | |
| C08F 4/06 | (2006.01) | |
| C08F 118/02 | (2006.01) | |
| C08F 20/44 | (2006.01) | |
| C08F 120/18 | (2006.01) | |

(52) U.S. Cl.
CPC .................................. *C08F 120/18* (2013.01)
USPC .......... 526/64; 526/147; 526/317.1; 526/319; 526/236; 526/90

(58) Field of Classification Search
CPC .............. C08F 4/40; C08F 20/06; C08F 4/50; C08F 220/18
USPC ................... 526/147, 64, 317.1, 319, 236, 90
See application file for complete search history.

(56) References Cited

FOREIGN PATENT DOCUMENTS

EP        2604633 A1 *  6/2013

OTHER PUBLICATIONS

N. Chan et al, Polym. Chem., vol. 3 (2012), pp. 1322-1333.
N. Chan et al, Macromolecular Rapid Communications, vol. 32, pp. 604-609 (2011).
N. Chan et al, Polym. Chem., vol. 3, pp. 486-497 (2012).

* cited by examiner

*Primary Examiner* — William Cheung
(74) *Attorney, Agent, or Firm* — Steven C. Bauman

(57) ABSTRACT

This invention provides methods for controlled single electron transfer living radical polymerization (SET-LRP) of monomers with increased conversion, high molecular weights and low polydispersity by allowing the polymerization to proceed at low temperatures via a tubular reactor either made of copper or containing copper metal surface.

31 Claims, 1 Drawing Sheet

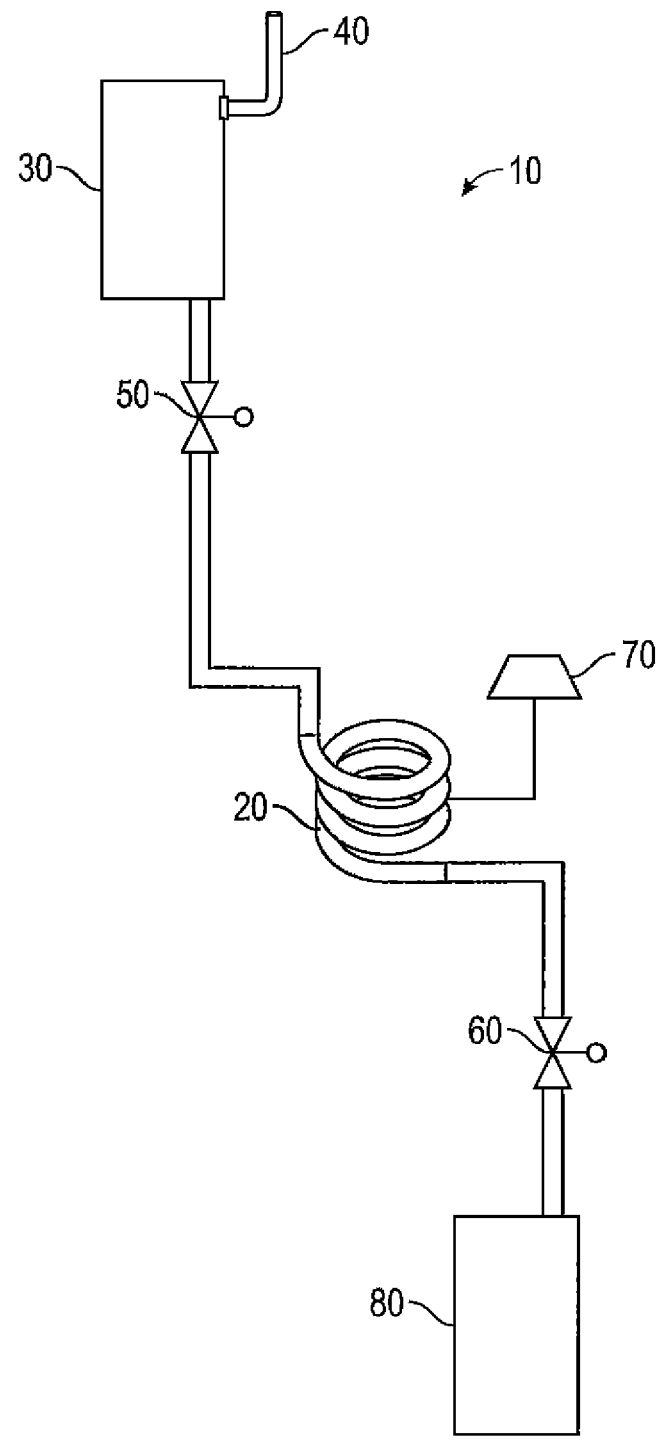

METHODS AND APPARATUS FOR CONTROLLED SINGLE ELECTRON TRANSFER LIVING RADICAL POLYMERIZATION

FIELD OF THE INVENTION

The invention is related to methods for the controlled radical polymerization of monomers. More particularly, the invention relates to methods for controlled single electron transfer living radical polymerization (SET-LRP) of monomers with, inter alia, increased conversion and low polydispersity.

BACKGROUND OF THE INVENTION

Controlled radical polymerization (hereinafter CRP), including single-electron transfer living radical polymerization (hereinafter SET-LRP) and atom transfer living polymerization (hereinafter ATRP), is a process which produces various polymer products in high yield with functional, non-terminated ends, with high molecular weights, and with a low polydispersity index. In CRP, chain transfer and termination reactions are essentially nonexistent relative to the polymer propagation reaction. These developments have led to the production of polymers that exhibit precise and quantitative functionality and to the development of functional polymers that possess specific chemical reactivity. Thus, CRP has been employed to design a variety of polymer products. However, these polymer products typically produced through CRP resulted in curable products with functional groups at their terminal ends.

There has been a continuing effort to make the controlled radical polymerization as environmentally benign and as low cost a process for the preparation of functional materials as possible. Factors such as control over the polymer molecular weight, molecular weight distribution, composition, architecture, and functionality are important considerations in the design and execution of such methods.

There exists a need in the art for a method of radical polymerization which is efficient, effective, and can produce controlled polymer products with desirable properties, characteristics, and features reliably, as well as on a large-scale level.

SUMMARY OF INVENTION

In one aspect, the present invention provides methods for SET-LRP of monomers with, inter alia, increased conversion, low polydispersity and in high conversion.

In another aspect, the present invention provides methods for SET-LRP of (meth)acrylate polymers in a continuous reactor. The use of a continuous flow reactor allows for the synthesis of many (meth)acrylate polymers via SET-LRP in a tubular reactor either made of copper or containing copper within the tube.

In another aspect, the present invention provides methods for SET-LRP of (meth)acrylate polymers in a tubular reactor made of either a transition metal or containing transition metal within the tube. The use of a continuous flow reactor allows for the synthesis of many (meth)acrylate polymers via SET-LRP.

In another aspect, the present invention provides methods for SET-LRP of (meth)acrylate polymers in a tubular reactor made of either copper or containing copper within the tube. The use of a continuous flow reactor allows for the synthesis of many (meth)acrylate polymers via SET-LRP.

In yet another aspect, the present invention provides methods for SET-LRP of (meth)acrylate polymers in a continuous tubular reactor. The use of continuous reactor allows for the production of (meth)acrylate polymers in a relatively short amount of time versus them being prepared in a reaction vessel. The reaction temperature (5-70° C., sometimes about 22° C.) is also well below a batch processing temperature (usually at least 40° C. or higher), and also allows for a lower exotherm.

In another aspect, the present invention provides methods for SET-LRP of (meth)acrylate polymers in a continuous tubular reactor either made of copper or containing copper within the tube. This reactor also allows for a smaller manufacturing footprint and more efficient heat transfer because of the large surface area of the copper tubing.

In still another aspect, the present invention provides the advantage of producing (meth)acrylate polymers of different compositions (homopolymers, block copolymers, terpolymers and the like) at different molecular weights with a low polydispersity index ("PDI") of <1.4 in a continuous reactor. SET-LRP in a continuous reactor has not been widely used to produce meth(acrylate) polymers. N. Chan et al, *Macromolecular Rapid Communications*, Vol. 32 (2011), pages 604-609, describe a process which makes methyl acrylate polymers via a copper tube only to a molecular weight of 6,600 and a polydispersity index of 1.44 at a batch size of 32 mL. Other publications of interest include N. Chan et al, *Polym. Chem.*, Vol. 3 (2012), 1322-1333, and N. Chan et al, *Polym. Chem.*, Vol. 3 (2012), 486-4971333.

In still another aspect, the present invention allows the production of living polymers via a tubular reactor either made of copper or containing copper metal at low temperatures e.g., 5 to 70° C. Preferably, the reaction temperature is in the range 20-40° C. and more preferably at ambient or near temperatures, e.g. 20-30° C.

Having the reaction mixture pass through the tubular reactor produces polymers via SET-LRP with high conversion and low PDI <1.4.

Non-limiting list of advantages of the present process include fast polymerization, narrow PDI, tunable process for manufacturing a wide spectrum of high quality polymers, rapid screening of solvents, monomers, temperatures, and the like.

Additionally, the polymers of the invention have excellent applications in various fields such as, for example, automotive, electronics, potting, gasketing, and the like.

These and other aspects of the invention will be better understood through a study of the following description and examples.

BRIEF DESCRIPTION OF THE DRAWINGS

FIG. 1 depicts an embodiment of an illustrative reactor vessel suitable to carry out SET-LRP in accordance with the present invention.

DETAILED DESCRIPTION OF THE INVENTION

The embodiments of the present invention meet the need in the art for a method of SET-LRP which is efficient, effective, and can reliably produce controlled polymer products with desirable properties, characteristics, and features. Further, the methods of the present invention may be practiced on a small, large, or commercial scale with the same level of practicability and predictability of the results.

In one aspect, the present invention provides a continuous SET-LRP process comprising:

(i) charging a reactor system with a polymerizable reaction fluid comprising at least one polymerizable (meth)acrylate monomer, at least one solvent for said monomer, at least one metal or metal salt, at least one ligand and at least one initiator; wherein said reactor system comprises a reaction vessel configured for continuous polymer production, with said reaction vessel comprising a catalytic surface wherein said catalytic surface comprises copper which has been pre-treated with a reducing agent and has sufficient catalyst present to convert said polymerizable reaction fluid to a radical living polymer (RLP) having a polydispersity of 1.9 or less;

(ii) running a continuous SET-LRP reaction in said reaction vessel for a time and at a temperature sufficient to produce a desired level of polymer conversion having said polydispersity; and (iii) isolating said polymer.

In another aspect, the present invention provides a continuous SET-LRP process comprising:

(i) charging a reactor system with a polymerizable reaction fluid comprising at least one polymerizable (meth)acrylate monomer, at least one solvent for said monomer, at least one metal or metal salt, at least one ligand and at least one initiator; wherein said reactor system comprises a reaction vessel configured for continuous polymer production, with said reaction vessel is a tubular reaction vessel comprising a catalytic surface wherein said catalytic surface comprises copper which has been pre-treated with a reducing agent and has sufficient catalyst present to convert said polymerizable reaction fluid to a radical living polymer (RLP) having a polydispersity of 1.9 or less;

(ii) running a continuous SET-LRP reaction in said reaction vessel for a time and at a temperature sufficient to produce a desired level of polymer conversion having said polydispersity; and (iii) isolating said polymer.

In another aspect, the present invention provides a continuous SET-LRP process comprising:

(i) charging a reactor system with a polymerizable reaction fluid comprising at least one polymerizable (meth)acrylate monomer, at least one solvent for said monomer, at least one metal or metal salt, at least one ligand and at least one initiator; wherein said reactor system comprises a reaction vessel configured for continuous polymer production, with said reaction vessel comprising a catalytic surface wherein said catalytic surface comprises copper which has been pre-treated with hydrazine hydrate and has sufficient catalyst present to convert said polymerizable reaction fluid to a radical living polymer (RLP) having a polydispersity of 1.9 or less;

(ii) running a continuous SET-LRP reaction in said reaction vessel for a time and at a temperature sufficient to produce a desired level of polymer conversion having said polydispersity; and (iii) isolating said polymer.

In another aspect, the present invention provides a continuous SET-LRP process comprising:

(i) charging a reactor system with a polymerizable reaction fluid comprising at least one polymerizable (meth)acrylate monomer, at least one solvent for said monomer, at least one metal or metal salt, at least one ligand and at least one initiator; wherein said reactor system comprises a reaction vessel configured for continuous polymer production, with said reaction vessel is a tubular reaction vessel comprising a catalytic surface wherein said catalytic surface comprises copper which has been pre-treated with hydrazine hydrate and has sufficient catalyst present to convert said polymerizable reaction fluid to a radical living polymer (RLP) having a polydispersity of 1.9 or less;

(ii) running a continuous SET-LRP reaction in said reaction vessel for a time and at a temperature sufficient to produce a desired level of polymer conversion having said polydispersity; and (iii) isolating said polymer.

The reaction vessel is typically a tubing or coil made of a suitable transition metal. Especially suitable tubing or coil is one that is of copper or made of copper or comprising copper.

In a preferred embodiment, the copper of the reaction vessel is pre-treated with a suitable reducing agent prior to coming into contact with the polymerization medium. This may be typically done by treating (e.g. rinsing) the copper (or the transition metal) of the reactor with a solution of the reducing agent in a suitable organic solvent. An especially suitable reducing agent is hydrazine or hydrazine hydrate. Solvent such as acetone, alcohol, ester and the like may be used to dissolve the reducing agent (e.g. hydrazine or hydrazine hydrate). The treatment (e.g. rinsing) with the reducing agent my be done for a period of about 5-60 minutes generally, 10-40 minutes preferably and for about 10-20 minutes typically. The solution may contain the reducing agent in quantities of about 500-5,000 ppm generally and 1,000-2,000 ppm preferably.

Suitable polymerizable monomers are (meth)acrylates, of the formula $CH_2=C(R^1)(CO_2R^2)$, where $R^1$ is H or $CH_3$ and $R^2$ is $C_{1-20}$ alkyl, $C_{6-20}$ aryl, or $C_{7-20}$ aralkyl. Specifically, the monomer may be one or more of, for example, alkyl(meth)acrylates; alkoxyalkyl(meth)acrylates; (meth)acrylic acids; and combinations thereof. More specifically, the monomers used to create polymers with the embodiments of the present invention are not limited to any particular species but includes various monomers, for example: (meth)acrylic acid monomers such as (meth)acrylic acid, methyl(meth)acrylate, ethyl(meth)acrylate, n-propyl(meth)acrylate, isopropyl(meth)acrylate, n-butyl(meth)acrylate, isobutyl(meth)acrylate, tert-butyl(meth)acrylate, n-pentyl(meth)acrylate, n-hexyl(meth)acrylate, cyclohexyl(meth)acrylate, n-heptyl(meth)acrylate, n-octyl(meth)acrylate, 2-ethylhexyl(meth)acrylate, nonyl(meth)acrylate, decyl(meth)acrylate, dodecyl(meth)acrylate, phenyl(meth)acrylate, toluoyl(meth)acrylate, benzyl(meth)acrylate, 2-methoxyethyl(meth)acrylate, 3-methoxybutyl(meth)acrylate, 2-hydroxyethyl(meth)acrylate, 2-hydroxypropyl(meth)acrylate, stearyl(meth)acrylate, glycidyl(meth)acrylate, 2-aminoethyl(meth)acrylate, (methacryloyloxypropyl)trimethoxysilane, (meth)acrylic acid-ethylene oxide adducts, trifluoromethylmethyl(meth)acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl(meth)acrylate, perfluoromethyl(meth)acrylate, diperfluoromethylmethyl(meth)acrylate, 2-perfluoromethyl-2-perfluoroethylethyl(meth)acrylate, 2-perfluorohexylethyl(meth)acrylate, 2-perfluorodecylethyl(meth)acrylate and 2-perfluorohexadecylethyl(meth)acrylate.

The solvent may be implemented with the present invention in order to, for example, reduce viscosity of the reaction mixture, increase conversion of the ligand, and promote fast disproportionation of the catalyst in order to facilitate ultrafast polymerization. Further, the solvent should be non-reactive in order to prevent chain transfer, side reactions, or poisoning of the catalyst. Preferred solvents of the present methods include dipolar, protic, or aprotic solvents. Some preferred solvents include water, alcohol, natural or synthetic polymeric alcohols, dipolar aprotic solvents, ethylene carbonate, propylene carbonate, ionic liquid, or a mixture thereof. For example, such solvents may include: $H_2O$, MeOH, EtOH, ethylene glycol, diethylene glycol, triethylene glycol, 2-(2-ethoxyethoxy)ethanol, tetraethylene glycol, glycerine, HEMA, phenols, DMSO, DMF, DMAc, NMP, etc., ionic liquids, ethylene carbonate, and propylene carbonate. Suitable alcohols include methanol, ethanol, propanol, isopropanol, butanol, and tert butanol, glycerine, and other natural and synthetic polymers continuing OH groups. Desirably, the solvent or solvent blend chosen does not cause precipitation of the polymer product during the reaction.

The amount of solvent in the reaction polymerization medium is in the range 5-75 weight %, preferably in the range 5-30 weight % based on the total weight of the polymerization medium.

The catalyst for the polymerization is generally a complex of a metal or metal salt with a ligand. Suitable metal is a transition metal which is part of the surface of the reactor vessel or the reactor vessel is made of such metal or metal salt. Suitable metals are transition metals such as, for example, Cu, Mn, Ni, Pt, Fe, Ru, V, Au, Ag, Hg, Rh, Co, Ir, Os, Re, Mn, Cr, Mo, W, Nb, Ta, Zn, and the like. Suitable salts of the above-noted metals are, for example, halides, acetate, oxide, sulfide and the like. A preferred metal is copper and a preferred salt is Cu(II) bromide.

Suitable ligands in the present invention include, for example, a nitrogen-containing ligand which may aid in the extraction of the metal (or metal salt) catalyst to the extent that the metal catalyst may be solubilized by the ligand so it is available in its higher oxidation state. Thus, the ligand may be desirable to drive the polymerization reaction to the effect that it may aid in promoting a mixture of the various components of the reaction mixture on a molecular level. A wide variety of nitrogen-containing ligands are suitable for use in the present invention. These compounds include primary, secondary, and tertiary alkyl or aromatic amines, as well as polyamines which may be linear, branched, or dendritic polyamines and polyamides. Suitable ligands for use in the present invention include ligands having one or more nitrogen, oxygen, phosphorus and/or sulfur atoms which can coordinate to the transition metal through a sigma-bond, and ligands containing two or more carbon atoms which can coordinate to the transition metal through a pi-bond. For example, suitable ligands may include tris(2-dimethylaminoethyl)amine (Me6-TREN), tris(2-aminoethyl)amine (TREN), 2,2-bipyridine (bpy), N,N,N,N,N-pentamethyldiethylenetriamine (PMDETA), and many other N-ligands.

The ligand may preferentially form a soluble complex with the redox conjugate of the transition metal, i.e. the higher oxidation state of the transition metal, forming a complex that is active in the deactivation of the growing radical chain, which may contribute to a narrow molecular weight distribution of the polymer product.

Initiators suitable for the present method may initiate the free radical reaction and thusly, may be considered as contributors to the number of growing polymer chains in the reaction vessel. Suitable initiators include, for example, halogen containing compounds. Examples of initiators include chloroform, bromoform, iodoform, carbon tetrachloride, carbon tetrabromide, hexahalogenated ethane, mono-di, and tri haloacetates, acetophenones, halogenated amides, and polyamides such as nylons, halogenated urethanes and polyurethane including their block copolymers (RO halogenated imides, acetone, and any other initiators shown to work with conventional metal catalyzed living radical polymerization including SET-LRP.

A wide variety of initiators are suitable for use in the present invention. Halogenated compounds are particularly suited for use in the invention. These initiators include compounds of the formula R—X or R'C(=O)OR" where X is a halogen, R is a $C_1$-$C_6$ alkyl, R' is a $C_1$-$C_6$ alkyl containing at least one halogen atom (e.g., 1, 2 or 3) attached to the carbon atom adjacent to the carbonyl group, and R" is a $C_1$-$C_6$ alkyl. For example, the initiator may include: diethyl meso-2,5-dibromoadipate; dimethyl 2,6-dibromoheptanedioate, ethylene glycol bis(2-bromopropionate); ethylene glycol mono-2-bromopropionate; trimethylolpropane tris(2-bromopropionate); pentaerythritol tetrakis(2-bromopropionate); 2,2-dichloacetophenone; methyl 2-bromopropionate; methyl 2-chloropropionate; N-chloro-2-pyrrolidinone; N-bromosuccinimide; polyethylene glycol bis(2-bromopropionate); polyethylene glycol mono(2-bromopropionate); 2-bromopropionitrile; dibromochloromethane; 2,2-dibromo-2-cyanoacetamide; α,α'-dibromo-ortho-xylene; α,α'-dibromo-meta-xylene; α,α'-dibromo-para-xylene; α,α'-dichloro-para-xylene; 2-bromopropionic acid; methyl trichloroacetate; para-toluenesulfonyl chloride; biphenyl-4,4'-disulfonyl chloride; diphenylether-4,4'-disulfonylchloride bromoform; iodoform carbon tetrachloride; and combinations thereof. In some embodiments, the initiator may be an alkyl, sulfonyl, or nitrogen halide. The nitrogen halide can be also halogenated nylon, peptide, or protein. Alternatively, a polymer containing active halide groups, for example, poly(vinyl)chloride), the chloromethyl group or polychrolomethylsytrene) of the polymers and copolymers can also be used as initiators.

The polymerization reaction is performed suitably at temperatures stated above or near ambient temperatures, for example, about 20-30° C.

Suitable continuous reaction vessel is a continuous reactor which provides a large surface area for efficient interaction of the ingredients during the polymerization process. A suitable reactor is a tubular reactor such as those described earlier. Particularly preferred tubular reactor is a coil type tubular reactor that provides a large surface area.

Thus, in one aspect of the present invention, there is provided a reactor set-up. A non-limiting Example of a suitable reactor is shown in FIG. 1.

The methods of the present invention allow for great control over the final polymer products such that the desired chain length, polydispersity, molecular weight, and functionality are easily incorporated into the final product. Thus, the present invention overcomes the poor control over molecular weight distribution, low functionality, poor control of polymer rheology, and undesirable polydispersity of previous methods Also, because this process is so predicable, it can be easily implemented on a large scale with a high predictability and/or used to tailor the properties of the final polymer products to new degrees, and products can be designed based on their properties. The structure and composition of the polymer are more precise and the end product has more desirable properties and characteristics to promote a better product. Further, the components of the system may be optimized to provide even more precise control over the (co)polymerization of monomers.

The products of the present invention may be used as plastics, elastomers, adhesives, emulsifiers, thermoplastic elastomers, etc.

Desirable polymers from the method have certain properties and characteristics. Desirably, the final polymer product may be predictably produced to have a low polydispersity, and a molecular weight close to the theoretical molecular weight. While values and measurements of these features are provided in the Examples section herein, a brief discussion of each of the properties follows.

The degree of polymerization is the number average molecular weight divided by the weighted average molecular weight of all monomers in the feed, which, in a controlled polymerization, is a linear function of monomer conversion. SET-LRP requires the following two conditions: the initiation should be sufficiently fast so that nearly all chains start to grow simultaneously; and little or no chain transfer occurs to increase the total number of chains. It is well known to those skilled in the art of polymers that when the polydispersity index of a polymer is broad, the polymer contains polymeric segments with substantial smaller and larger molecular weight segments than the number average molecular weight of the polymer. On the one hand, low molecular weight segments may have an adverse effect on physical properties of the polymer such as tensile strength, elongation and flexural modulus; while on the other hand, very large molecular weight segments may result in high melt viscosity of the polymer which may produce limitations in the processability of the polymer. Thus, there are distinct advantages when the final polymer has a well defined and narrow polydispersity index. This permits a more predictable polymer product from a property perspective and minimizes the aforementioned disadvantages.

It is desirable to have a narrow molecular weight distribution i.e. polydispersity index in the final polymer product. A narrow molecular weight distribution may be achieved from the polymerization in accordance with the present invention, as the chain length, end group functionality, and consistency of the polymer is substantially constant. In achieving a narrow molecular weight distribution, several factors may be promoted. Some factors which contribute to a narrow molecular weight distribution include: (1) a rate of initiation, which is competitive with the rate of propagation (allowing the simultaneous growth of all the polymer chains); (2) the exchange between species of different reactivities being faster than propagation (ensuring that all the active chain termini are equally susceptible to reaction with monomer for a uniform growth); (3) low to no chain transfer or termination; (4) the rate of activation versus deactivation; and (5) a homogenous system where mixing is sufficiently fast (all active centers are introduced at the onset of the polymerization). A polymerization which meets these factors may have a polydispersity close to the theoretical value of the Poisson distribution 1+1/DP. For example, the PD of the polymer products of the present methods may be below 1.9, e.g. 1.1 to 1.9; more specifically less than 1.4, e.g. 1.1 to 1.4; and in certain cases less than 1.1, e.g. 1.035.

Another characteristic of the final product is long-lived polymer chains. This refers to all chains retaining their active centers after full consumption of the monomer. Thus, propagation resumes upon the introduction of an additional monomer. This factor enables the preparation of block copolymers by sequential monomer addition.

The present polymerization provides the best opportunity to control the bulk properties by selection and control of various aspects of the multitude of variations in composition, functionality and topology at a molecular level. With the methods of the present invention, many of the characteristics and factors previously discussed can be controlled in order to ensure that the polydispersity, molecular weight, functionality, and long-lived chain length are promoted in the final polymer product. For example, polydispersity may be controlled in the present invention by ensuring that the rate of deactivation is the same or greater than the rate of initial propagation (activation).

Some embodiments of the present invention relate to a polymerization process for the control of the microstructure of polymers and copolymers. Some embodiments of the present invention relate to living radical polymerization of halogen-containing and acrylic monomers utilizing organohalide initiators and to the formation of polymers therefrom. The processes of the various embodiments provide final polymer products which have narrow molecular weight distributions, which are obtained by high and efficient conversion and rapid or ultrafast polymerization reactions. Thus, the final polymer products obtained through the present methods have predictable molecular weights, a low polydispersity index, and high functionalities.

FIG. 1 provides an embodiment of an apparatus 10 of the invention. The apparatus 10 for SET-LRP includes a reaction vessel 20 which is a copper coil of outer diameter (OD) 0.25"; a feed tank 30; a nitrogen (or argon) line 40 for sparging and maintaining an inert atmosphere (and sealing out air and/or oxygen) during the polymerization reaction; a valve 50 to control the flow of the polymerization medium into the copper coil; a needle valve 60 to control flow; a thermocouple 70 to measure the temperature of the coil; and a receiving tank 80. The reaction vessel 20 may be configured preferably in coil form as shown or any other suitable form which provides substantial surface area for the polymerization medium to come in contact with the copper surface. It should be understood that the reaction vessel 20 as well as the reaction apparatus 10 may be configured to include a plurality of inlets and outlets for various functions and applications, as may be desired. Also, various tubings, lines, pumps and the like may be employed to connect the various components to one another. Furthermore, the reaction apparatus 10 may include analytical instrument or instruments as needed to measure various properties such as, for example, the rate of the reaction, the level of conversion, the relative yield, the existence of side-reactions, impurities, characteristics of intermediates, molecular weights, polydispersity index etc. These instrument or instruments may be separate from the reaction apparatus 10 also.

Non-limiting examples of useful analytical instruments and methods may be selected from: spectroscopy devices, chromatography instruments, nuclear magnetic resonance instruments, mass spectronomer instruments, gel permeation chromatography techniques, and combinations of these instruments or techniques. The analytical instruments may either be in-line or separate from to the apparatus, with samples withdrawn from the reaction vessel.

The conversion level may be measured by spectroscopic analysis. For example, the analysis and characterization of the final product may be completed by infrared spectroscopy. This may include, UV-VIS IR, Spectrophotometry, Gel Permeation Chromatography (GPC), FTIR analysis, as well as other spectroscopic techniques. For example, one useful analytical instrument 70 may be a Fourier Transform Infrared spectrophotometer configured with a probe in the reaction vessel to take periodic measurements of the level of conversion of the reaction mixture as the reaction proceeds.

Alternatively, the relative viscosity increase of the reaction mixture may be determined by means of a stirrer fitted with a torque analyzer and correlated to monomer conversion through an independent calibration. Also, it should be noted that samples can be withdrawn periodically from the reactor and analyzed externally by such techniques as NMR, GPC, refractive index, light absorption, colorometrically etc.

Further, though the degree of conversion may be measured analytically, it may also be measured theoretically.

The methods of the invention may be performed in the exemplary apparatus of FIG. 1, or in its equivalents, as is known in the art.

Without being bound to any theory, it is believed that the SET-LRP reaction starts with an SET reaction between Cu(0) species and the halogen-containing substrate (initiator or halogen-terminated polymeric chain end). Any polar solvent facilitates the decrease of interaction between the anion (X-) and the electrophilic radical (R¥) from the radical-anion pair. The radical-anion cluster and Cu/L+ countercation must be in close proximity in the so-called caged ion pair, thus further facilitating decomposition of the radical anion into the electrophilic radical and the anion (X-). The reaction between a radical and the deactivator $CuX_2$/ligand in polar media is a more complex process. One of the possible mechanisms may involve the transfer of the halide anion X from the deactivator to the propagating macroradical R¥, leading to a similar ion cage composed of a radical-anion [R---X]¥— and a CuX/L+ countercation. With SET-LRP, an acceleration of the "Cu(I) X"-catalyzed LRP initiated with alkyl halides, sulfonyl halides, and N-halides is observed in $H_2O$, alcohols, ethyleneglycol, DMSO, DMF, and ionic liquids, including for example, a high molar mass material like polymethacrylate.

This polymerization proceeds by an outer-sphere SET mechanism in which Cu(0) species act as electron donors, and the dormant initiator and propagating R—X species act as electron acceptors. By contrast with other metal-catalyzed LRPs, including ATRP, in which excess $Cu(II)X_2$ species are created by the undesired radical dimerization, here, the Cu(II) $X_2$ species responsible for the reversible deactivation of the radicals are formed by the disproportionation of Cu(I)X. The outer-sphere SET process involved in this new polymerization has very low activation energy. Therefore, SET-LRP involves very fast activation and deactivation steps and negligible bimolecular termination at room temperature.

The ligand may preferentially form a soluble complex with the redox conjugate of the transition metal, i.e. the higher oxidation state of the transition metal, forming a complex that is active in the deactivation of the growing radical chain, which may contribute to a narrow molecular weight distribution of the polymer product.

The capping agent may include one or a combination of compounds, as may be desired to cap the end group of the final product with a desired functional end group while maintaining chain stability and integrity. For example the capping agent may include: 2 allyl alkyl ethanol, allyl alcohol, allyl glycidyl ether, 1-6 heptadiene, cyclooctyl diene, norbornadiene, and other olefins with a known tendency to not form homopolymers under SET-LRP conditions.

The purification step of the resulting capped polymer product may include removing catalyst from the final polymer product. Purification may be performed by running the reaction mixture including the final product through an alumina column, a silica column, activated charcoal, cross-linked polymers with copper scavenging groups, or by treating the reaction mixture with a material with a copper chelating group.

If functionalization of the final product by a substitution reaction is desired, further steps may include: providing a final polymer product; quenching the reaction; purifying the reaction mixture; substituting of a polymer intermediate with a nucleophile; and purifying a substituted polymer product.

The quenching step may include, for example: quenching the reaction with oxygen, or with a terminating agent.

The purification step of the reaction mixture may include removing catalyst from the final polymer product. Purification may be performed by running the reaction mixture including the final product through an alumina column, a silica column, activated charcoal, cross-linked polymers with copper scavenging groups, or by treating the reaction mixture with a material with a copper chelating group.

The nucleophile agent for substitution of the halogen atoms may include, for example, phosphine, thiolate, amine, azide, carboxylate, alkoxide, and sodium carboxylate.

The final purification step may include running the reaction mixture including the final product through an alumina column. The method also includes the formation of co-polymers and/or block co-polymers. Thus, the methods includes the step of adding a sequential monomer differing from the monomer initially charged in the vessel, and reiterating some of the earlier steps until a desired conversion level is reached. In the reaction vessel, after a first reaction has progressed to a desired level of conversion, a different monomer may be added into the reaction vessel. The reaction proceeds with the different monomer building block. As an alternative, after the reaction has progressed to a desired level of conversion, the reaction may be quenched and purified. Then to the apparatus, complete with fresh ligand and catalyst, the polymer product may be used with a second monomer, and the polymer product may act as a macroinitiator for the sequential polymerization. The resulting polymer may be a block copolymer, taking one or more various forms. These forms may include, for example, telechelic polymers (polymer carrying functionalized end groups) and/or block copolymers.

The final products of the methods of the present invention amy include, for example, homopolymers and/or (co)polymers, which may be block, random, statistical periodic, gradient star, graft, comb, (hyper)branched or dendritic polymers. The "(co)" parenthetical prefix in conventional terminology is an alternative, viz., "(co)polymer means a copolymer or polymer, including homopolymer. Similarly "(hyper)" as used herein, refers to a comparatively high degree of dendritic-like branching along the co-polymer backbone as compared to a low degree of branching.

The present invention may be used to prepare periodic or alternating copolymers. The methods of the present invention may be particularly useful for producing alternating copolymers where one of the monomers has one or two bulky substituents, from which homopolymers may be difficult to prepare, due to steric considerations. Copolymerization of monomers with donor and acceptor properties results in the formation of products with predominantly alternating monomer structure.

"Alternating" copolymers are prepared by copolymerization of one or more monomers having electron-donor properties with one or more monomers having electron acceptor type properties (acrylates, methacrylates, unsaturated nitriles, unsaturated ketones, etc.). The random or alternating copolymer can also serve as a block in any of the present block, star, graft, comb or hyperbranched copolymers.

The end product may be characterized by one or more features, including: molecular weight, polydispersion, monomodal distribution of molecular weights, etc.

One or more of the methods of the present invention may yield a polymer product having a molecular weight of 2,000 to 20,000,000 g/mol. Further, the polymer product may also have a polydispersity of about 1.9 or less, sometimes 1.035 to 1.4, and sometimes 1.1 to 1.2. In certain embodiments, the polymer produced by the process described herein has a number average molecular weight of at least about 500-500,000 g/mol. In other embodiments the polymer has a number average molecular weight of 5,000-100,000 g/mol. In yet other embodiments the polymer has a number average molecular weight of 25,000-55,000 g/mol.

While the invention has been described in relationship to the preferred embodiments, it will be understood by those skilled in the art that various changes may be made without deviating from the fundamental nature and scope of the invention as defined in the appended claims. Any of the embodiments disclosed herein may be used in combination with other features.

EXAMPLES

Example 1

Synthesis of 30K Dibromo Terminated Polybutyl Acrylate in Methanol

Prior to beginning the reaction the copper coils were rinsed with acetone containing 1,000-2,000 ppm hydrazine hydrate for at least 15 mins.

To the feed tank was added n-butyl acrylate (185.85 g; 1.45 moles), methanol (189 g), tris(2-methylaminoethyl)amine (0.231 g; 0.0010 moles), copper (II) bromide (0.01 g; 0.00005 moles), diethylmeso-2,5-dibromoadipate (1.80 g; 0.005 moles). The material in the feed tank was degassed with a subsurface sparge of nitrogen for 30 mins. The bottom valve of the feed tank was opened allowing the solution to fill the copper coils, The material sat in the tubular reactor until an exotherm was noted <5 mins and then the valve at the bottom of the tubular reactor was opened slightly allowing the material to flow through the copper coils. After about 2 hours, all the solution had passed out of the copper coils into the receiving flask. The polymerization was terminated by purging butyl homo polymer solution with air.

The conversion and structure of the polymer was confirmed by chromatographic and spectroscopic analyses. Size exclusion chromatography (SEC: THF; 1 mL/min; RI detector; PMMA calibration) indicated number average molecular weight (Mn) of 21,267 (60% conversion) and a polydispersity index of 1.12.

Example 2

Synthesis of 30K Dibromo Terminated Terpolymer

Prior to beginning the reaction the copper coils were rinsed with acetone containing 1,000-2,000 ppm hydrazine hydrate for at least 15 mins.

To the feed tank was added ethyl acrylate (42.47 g; 0.4242 moles), ethylene glycol methyl ether acrylate (13.80 g; 0.1061 moles), n-butyl acrylate (203.89 g; 1.59 moles), DMSO (78.13 g), acetone (48.8 g), tris(2-methylaminoethyl) amine (0.323 g; 0.0014 moles), copper (II) bromide (0.02 g; 0.0001 moles), diethylmeso-2,5-dibromoadipate (2.52 g; 0.007 moles). The material in the feed tank was degassed with a subsurface sparge of nitrogen for 30 mins. The bottom valve of the feed tank was opened allowing the solution to fill the copper coils. The material sat in the coils until an exotherm was noted <5 mins and then the valve at the bottom of the copper coils was opened slightly allowing the material to flow through the copper coils, After 2 hours all the solution had passed out of the copper coils into the receiving flask, The polymerization was terminated by purging terpolymer solution with air.

The conversion and structure of the polymer was confirmed by chromatographic and spectroscopic analyses. Size exclusion chromatography (SEC: THF; 1 mL/min; RI detector; PMMA calibration) indicated number average molecular weight (Mn) of 31,917 (85% conversion) and a polydispersity index of 1.17.

Example 3

Synthesis of 100K Dibromo Terminated Polybutyl Acrylate in Methanol Via Chain Extension of 22K Polybutyl Prior to beginning the reaction the copper coils are rinsed with acetone containing 1,000-2,000 ppm hydrazine hydrate for at least 15 mins.

To the feed tank was added n-butyl acrylate (153.8 g; 1.2 moles), methanol (150 g), tris(2-methylaminoethyl)amine (0.046 g; 0.00020 moles), copper (II) bromide (0.01 g; 0.00005 moles) and polybutyl acyrlate made via continuous reactor (Mn 22,000) (21.60 g; 0.001 moles). The material in the feed tank was degassed with a subsurface sparge of nitrogen for 30 mins, The bottom valve of the feed tank was opened allowing the solution to fill the copper coils. The material sat in the coils until an exotherm was noted <5 mins and then the valve at the bottom of the copper coil was opened slightly allowing the material to flow through the copper coils. After 4 hours, the solution had passed out of the copper coils into the receiving flask. The polymerization was terminated by purging butyl homo polymer solution with air. The conversion and structure of the polymer was confirmed by chromatographic and spectroscopic analyses. Size exclusion chromatography (SEC: THF; 1 mL/min; RI detector; PMMA calibration) indicated number average molecular weight (Mn) of 52,785 (32% conversion) and a polydispersity index of 1.12.

Subsequent Chain Extension Reactions:

Second pass through tubular reactor—Polybutyl acrylate solution from the receiving flask was then added to the feed tank and tris(2-methylaminoethyl)amine (0.023 g; 0.00010 moles) was added to solution, The solution was degassed with a subsurface sparge of nitrogen for 30 mins The bottom valve of the feed tank was opened allowing the solution to fill the copper coils. The material sat in the coils until an exotherm was noted <5 mins and then the valve at the bottom of the copper coil was opened slightly allowing the material to flow through the copper coils. After 4 hours all the solution had passed out of the copper coils into the receiving flask. The polymerization was terminated by purging butyl homo polymer solution with air. The conversion and structure of the polymer was confirmed by chromatographic and spectroscopic analyses. Size exclusion chromatography (SEC: THE; 1 mL/min; RI detector; PMMA calibration) indicated number average molecular weight (Mn) of 75,908 (44% conversion) and a polydispersity index of 1.19.

Third Pass Through Tubular Reactor:

Polybutyl acrylate solution from the receiving flask was then added to the feed tank and tris(2-methylaminoethyl) amine (0.023 g; 0.00010 moles) was added to solution. The solution was degassed with a subsurface sparge of nitrogen for 30 mins The bottom valve of the feed tank was opened allowing the solution to fill the copper coils. The material sat in the coils until an exotherm was noted <5 mins and then the valve at the bottom of the copper coil was opened slightly allowing the material to flow through the copper coils. After 4 hours all the solution had passed out of the copper coils into the receiving flask. The polymerization was terminated by purging butyl homo polymer solution with air.

The conversion and structure of the polymer was confirmed by chromatographic and spectroscopic analyses. Size exclusion chromatography (SEC: THF; 1 mL/min; RI detector; PMMA calibration) indicated number average molecular weight (Mn) of 92,670 (53% conversion) and a polydispersity index of 1.23.

Example 4

Synthesis of 30K Dibromo Terminated Terpolymer

Prior to beginning the reaction the copper coils are rinsed with acetone containing 1,000-2,000 ppm hydrazine hydrate for at least 15 mins.

To the feed tank was added ethyl acrylate (42.47 g; 0.4242 moles), ethylene glycol methyl ether acrylate (13.80 g; 0.1061 moles), n-butyl acrylate (203.89 g; 1.59 moles), DMSO (78.13 g), acetone (48.8 g), tris(2-methylaminoethy) amine (0.323 g; 0.0014 moles), copper (II) bromide (0.02 g; 0.0001 moles), diethylmeso-2,5-dibromoadipate (2.52 g; 0.007 moles). The material in the feed tank was degassed with a subsurface sparge of nitrogen for 30 mins. The bottom valve of the feed tank was opened allowing the solution to fill the copper coils. The material sat in the coils until an exotherm was noted <5 mins and then the valve at the bottom of the copper coils was opened slightly allowing the material to flow through the copper coils. After 2 hours all the solution had passed out of the copper coils into the catch flask. The polymerization was terminated by purging terpolymer solution with air.

The conversion and structure of the polymer was confirmed by chromatographic and spectroscopic analyses. Size exclusion chromatography (SEC: THF; 1 mL/min; RI detector; PMMA calibration) indicated number average molecular weight (Mn) of 31,917 (85% conversion) and a polydispersity index of 1.17.

What is claimed is:

1. A method of conducting a continuous SET-LRP process said method comprising:
   (i) charging a reactor system with a polymerizable reaction fluid comprising at least one polymerizable (meth)acrylate monomer, at least one solvent for said monomer, a metal salt, at least one ligand and at least one initiator; wherein said reactor system comprises a reaction vessel configured for continuous polymer production, with said reaction vessel comprising a catalytic surface wherein said catalytic surface is copper or comprises copper which has been pre-treated with a reducing agent and has sufficient catalyst present to convert said polymerizable reaction fluid to a radical living polymer having a polydispersity of 1.4 or less;
   (ii) running a continuous SET-LRP reaction in said reaction vessel for a time and at a temperature sufficient to produce a desired level of polymer conversion having said polydispersity; and
   (iii) isolating said polymer, wherein said reaction vessel is a tubular reactor or pipe.

2. The method of claim 1, wherein said reducing agent is hydrazine or hydrazine hydrate.

3. The method of claim 1, wherein said reaction vessel is made of copper.

4. The method of claim 1, wherein said reaction vessel has a copper surface.

5. The method of claim 1, wherein said (meth)acrylate monomer is selected from alkyl(meth)acrylate; alkoxyalkyl (meth)acrylate; (meth)acrylic acid; and combinations thereof.

6. The method of claim 5, wherein said (meth)acrylate monomer is selected from (meth)acrylic acid, methyl(meth)acrylate, ethyl(meth)acrylate, n-propyl (meth)acrylate, isopropyl(meth)acrylate, n-butyl(meth)acrylate, isobutyl(meth)acrylate, tert-butyl(meth)acrylate, n-pentyl(meth)acrylate, n-hexyl(meth)acrylate, cyclohexyl(meth) acrylate, n-heptyl(meth)acrylate, n-octyl(meth)acrylate, 2-ethylhexyl(meth)acrylate, nonyl(meth)acrylate, decyl (meth)acrylate, dodecyl(meth)acrylate, phenyl(meth)acrylate, toluoyl(meth)acrylate, benzyl(meth)acrylate, 2-methoxyethyl(meth)acrylate, 3-methoxybutyl(meth)acrylate, 2-hydroxyethyl(meth)acrylate, 2-hydroxypropyl(meth)acrylate, stearyl(meth)acrylate, glycidyl(meth)acrylate, 2-aminoethyl(meth)acrylate, (methacryloyloxypropyl)trimethoxysilane, (meth)acrylic acid-ethylene oxide adduct, trifluoromethylmethyl(meth)acrylate, 2-trifluoromethylethyl (meth)acrylate, 2-perfluoroethylethyl(meth)acrylate, 2-perfluoroethyl-2-perfluorobutylethyl(meth)acrylate, 2-perfluoroethyl(meth)acrylate, perfluoromethyl(meth)acrylate, diperfluoromethylmethyl(meth)acrylate, 2-perfluoromethyl-2-perfluoroethylethyl(meth)acrylate, 2-perfluorohexylethyl (meth)acrylate, 2-perfluorodecylethyl(meth)acrylate, 2-perfluorohexadecylethyl(meth)acrylate and combinations thereof.

7. The method of claim 1, wherein said solvent is a dipolar, protic, or aprotic solvent.

8. The method of claim 7, wherein said solvent is selected from the group consisting of water, alcohol, natural or synthetic polymeric alcohol, dipolar aprotic solvent, ethylene carbonate, propylene carbonate, ionic liquid, and a mixture thereof.

9. The method of claim 8, wherein said solvent is selected from the group consisting of water, methanol, ethanol, propanol, isopropanol, butanol, tert butanol, ethylene glycol, diethylene glycol, triethylene glycol, 2-(2-ethoxyethoxy) ethanol, tetraethylene glycol, glycerine, HEMA, a phenol, DMSO, DMF, DMAc, NMP, ethylene carbonate, and propylene carbonate, and combinations thereof.

10. The method of claim 1, wherein said metal salt is a salt of a transition metal.

11. The method of claim 10, wherein said metal is selected from the group consisting of Cu, Mn, Ni, Pt, Fe, Ru, V, Au, Ag, Hg, Rh, Co, Ir, Os, Re, Mn, Cr, Mo, W, Nb, Ta and Zn.

12. The method of claim 10, wherein said metal salt is a halide, acetate, oxide or sulfide.

13. The method of claim 10, wherein said metal is copper.

14. The method of claim 12, wherein said metal salt is Cu(II) bromide.

15. The method of claim 1, wherein said ligand is a nitrogen-containing ligand suitable to aid in the extraction of the metal (or metal salt) catalyst to the extent that the metal catalyst may be solubilized by the ligand so it is available in its higher oxidation state.

16. The method of claim 15, wherein said ligand has one or more nitrogen, oxygen, phosphorus or sulfur atoms which can coordinate to the transition metal through a sigma-bond, or contains two or more carbon atoms which can coordinate to the transition metal through a pi-bond.

17. The method of claim 16, wherein said ligand is selected from the group consisting of tris(2-dimethylaminoethyl) amine (Me6-TREN), tris(2-aminoethyl)amine (TREN), 2,2-bipyridine (bpy) and N,N,N,N,N-pentamethyldiethylenetriamine (PMDETA).

18. The method of claim 1, wherein said initiator is a compound of the formula R—X or R'C(=O)OR" wherein X is a halogen, R is a $C_1$-$C_6$ alkyl, R' is a $C_1$-$C_6$ alkyl containing at least one halogen atom attached to the carbon atom adjacent to the carbonyl group, and R" is a $C_1$-$C_6$ alkyl.

19. The method of claim 18, wherein said initiator is selected from the group consisting of diethyl meso-2,5-dibromoadipate; dimethyl 2,6-dibromoheptanedioate, ethylene glycol bis(2-bromopropionate); ethylene glycol mono-2-bromopropionate; trimethylolpropane tris(2-bromopropionate); pentaerythritol tetrakis(2-bromopropionate); 2,2-dichloroacetophenone; methyl 2-bromopropionate; methyl 2-chloropropionate; N-chloro-2-pyrrolidinone; N-bromosuccinimide; polyethylene glycol bis(2-bromopropionate); polyethylene glycol mono(2-bromopropionate); 2-bromopropionitrile; dibromochloromethane; 2,2-dibromo-2-cyanoacetamide; $\alpha,\alpha'$-dibromo-ortho-xylene; $\alpha,\alpha'$-dibromo-meta-xylene; $\alpha,\alpha'$-dibromo-para-xylene; $\alpha,\alpha'$-dichloro-para-xylene; 2-bromopropionic acid; methyl trichloroacetate; para-toluenesulfonyl chloride; biphenyl-4,4'-disulfonyl chloride; diphenylether-4,4'-disulfonylchloride bromoform; iodoform carbon tetrachloride; and combinations thereof.

20. The method of claim 1, further comprising repeating the reaction steps until the desired conversion level is reached.

21. The method of claim 1, further comprising measuring a conversion level of the reaction mixture with an analytical instrument.

22. The method of claim 1, wherein the conversion level is measured spectroscopic analysis.

23. The method of claim 1, wherein the method is performed in the substantial absence of oxygen.

24. The method of claim 23, further comprising continually purging the reaction vessel with a non-reactive gas.

25. The method of claim 24, wherein said non-reactive gas is nitrogen or argon.

26. The method of claim 1, wherein the polymer has a polydispersity index in the range of 1.035 to 1.4.

27. The method of claim 26, wherein the polymer has a polydispersity index in the range of 1.1-1.4.

28. The method of claim 1, wherein the polymer has a number average molecular weight in the range of about 500-500,000 g/mol.

29. The method of claim 28, wherein the polymer has a number average molecular weight in the range of about 25,000-100,000 g/mol.

30. The method of claim 29, wherein the polymer has a number average molecular weight in the range of about 25,000-55,000 g/mol.

31. A method of conducting a continuous SET-LRP process said method comprising:
(i) charging a reactor system with a polymerizable reaction fluid comprising at least one polymerizable (meth)acrylate monomer, at least one solvent for said monomer, a metal salt, at least one ligand and at least one initiator; wherein said reactor system comprises a reaction vessel configured for continuous polymer production surface in which is disposed a coil comprising copper or copper which has been pre-treated with a reducing agent;
(ii) running a continuous SET-LRP reaction in said reaction vessel for a time and at a temperature sufficient to convert said polymerizable reaction fluid to a radical living polymer having a polydispersity of 1.4 or less; and
(iii) isolating said polymer.

* * * * *